United States Patent
Duran

(10) Patent No.: US 10,604,314 B2
(45) Date of Patent: Mar. 31, 2020

(54) TAMPER-EVIDENT CONTAINER

(71) Applicant: Jacob Duran, Oroville, CA (US)

(72) Inventor: Jacob Duran, Oroville, CA (US)

(73) Assignee: D&D Reit, Inc, San Francisco, CA (US)

(*) Notice: Subject to any disclaimer, the term of this patent is extended or adjusted under 35 U.S.C. 154(b) by 443 days.

(21) Appl. No.: 15/429,081

(22) Filed: Feb. 9, 2017

(65) Prior Publication Data

US 2017/0225856 A1     Aug. 10, 2017

Related U.S. Application Data

(60) Provisional application No. 62/293,271, filed on Feb. 9, 2016.

(51) Int. Cl.
*B65D 55/02* (2006.01)
*A01G 9/02* (2018.01)

(52) U.S. Cl.
CPC ............. *B65D 55/026* (2013.01); *A01G 9/02* (2013.01)

(58) Field of Classification Search
CPC ............... B65D 17/404; B65D 51/226; B65D 51/2821; B65D 55/026; B65D 55/028; B65D 85/52; A01G 5/06; A01G 27/005
See application file for complete search history.

(56) References Cited

U.S. PATENT DOCUMENTS

| | | | | |
|---|---|---|---|---|
| 4,755,405 A | * | 7/1988 | Massucco | B29C 49/22 206/459.1 |
| 2002/0179461 A1 | * | 12/2002 | Mollstam | B65D 47/2031 206/222 |
| 2002/0195413 A1 | * | 12/2002 | Eastman | B65D 55/026 215/230 |
| 2005/0126632 A1 | * | 6/2005 | Farrell | B65D 51/2814 137/155 |
| 2005/0258129 A1 | * | 11/2005 | Model | B65D 39/0011 215/230 |
| 2011/0132788 A1 | * | 6/2011 | Middlesworth | B65D 71/0092 206/459.5 |
| 2013/0321152 A1 | * | 12/2013 | Schmidt | G08B 13/2451 340/572.1 |
| 2014/0260116 A1 | * | 9/2014 | Cooper | B65D 25/00 53/492 |
| 2016/0264325 A1 | * | 9/2016 | Ruggiero Ruggieri | B65D 55/066 |
| 2017/0066587 A1 | * | 3/2017 | Fenner, Jr. | B65D 85/52 |

\* cited by examiner

*Primary Examiner* — Christopher D Hutchens
(74) *Attorney, Agent, or Firm* — West & Associates, A PC; Stuart J. West

(57) ABSTRACT

A tamper-evident container comprising a vessel and a barrier that together enclose an interior space. The barrier has a marking chamber at least partially filled with a marking substance, such that when a product is inserted into the tamper-evident container through the barrier and passes through the marking chamber, the marking substance is applied to the product's surface. The presence of the marking substance on the product can indicate that it is the original product inserted into the tamper-evident container, while the absence of the marking substance on a product removed from the tamper-evident container can indicate that the original product has been replaced in the tamper-evident container with a substitute.

4 Claims, 4 Drawing Sheets

TAMPER-EVIDENT CONTAINER

CLAIM OF PRIORITY

This Application claims priority under 35 U.S.C. § 119(e) from earlier filed U.S. Provisional Application Ser. No. 62/293,271, filed Feb. 9, 2016, which is hereby incorporated by reference.

BACKGROUND

Field of the Invention

The present patent application relates generally to the field of product containers, particularly a container that indicates whether or not a product inside the container has been tampered with.

Background

The possibility of product tampering is an issue that is unfortunately faced by many consumers, merchants, and others in the retail chain. Consumers want to know that a product housed in a package is the original product that was placed there by a manufacturer, and not a counterfeit replacement or similar product of a lower quality substituted in the package by a nefarious party. Similarly, merchants want to know that a product they receive has not been tampered with during shipment and is indeed the original product they ordered from a supplier.

Many tamper-evident containers exist that are designed to determine whether a sealed container has been opened. For example, they often show if a seal on the container has been broken, thereby indicating the possibility that a product inside the formerly sealed container has been tampered with. However, such containers require that the product initially be housed entirely within the sealed container. As such, they would not be suitable when it is desired that a portion of the product extend out of the container.

Products are often packaged for sale, storage, or transport with at least a portion of the product left uncovered by packaging. For example, plants can be packaged in containers that substantially enclose their roots, while stems, leaves, petals, and/or other elements can extend outside the container. As such, portions of a plant that extend out of such a container can have access to air, water, and light, and/or be visible to be evaluated by people viewing the packaged plant. Similarly, other types of products can be packaged with some portions housed inside a container while other portions extend out of the container for display or other purposes.

What is needed is a tamper-evident container that allows users to detect product tampering when the product is not completely sealed within the container.

BRIEF DESCRIPTION OF THE DRAWINGS

Further details of the present invention are explained with the help of the attached drawings in which.

DETAILED DESCRIPTION

Figure 1:
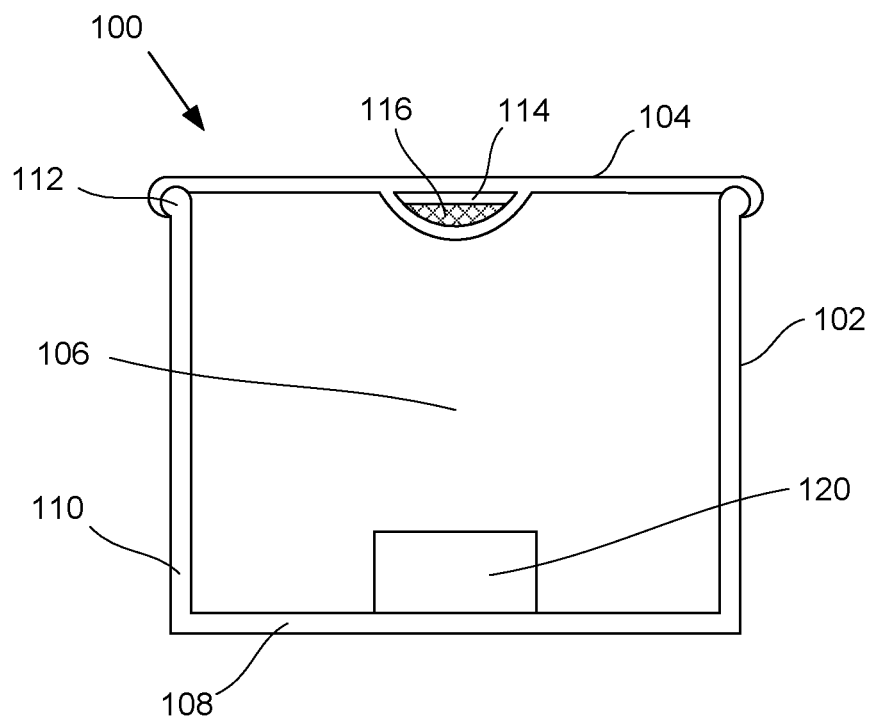
FIG. 1 depicts a side cross-sectional view of a tamper-evident container.
Figure 2:
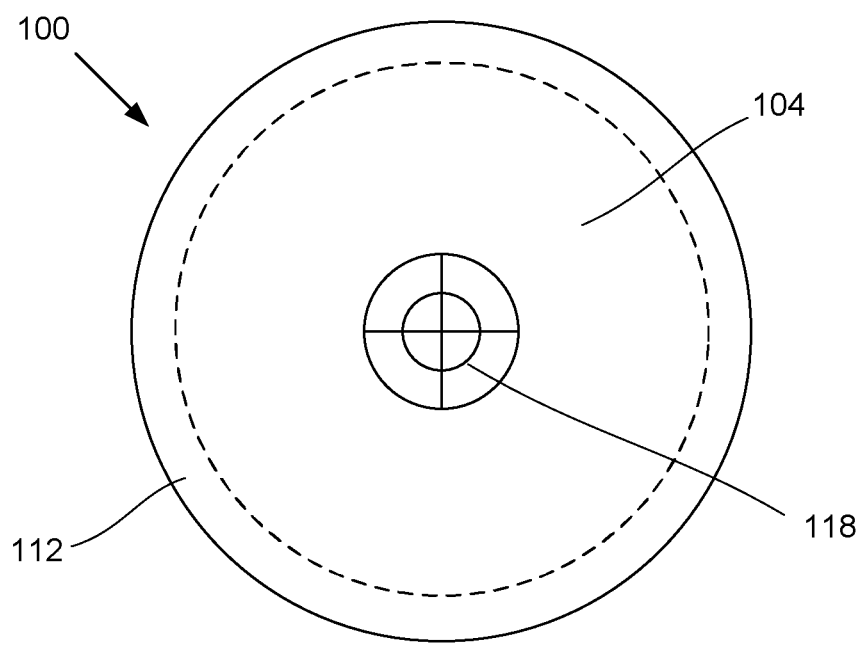
FIG. 2 depicts a top view of the tamper-evident container depicted in FIG. 1.

FIGS. 1 and 2 respectively depict a side cross-sectional view and a top view of an exemplary embodiment of a tamper-evident container 100. A tamper-evident container 100 can comprise a vessel 102 and a barrier 104 that together enclose an interior space 106 within the tamper-evident container 100.

The vessel 102 can have a floor 108 and walls 110 extending from the floor 108. The walls 110 can terminate at a rim 112 defining an open end of the vessel 102. By way of a non-limiting example, as shown in the embodiment of FIGS. 1-2, the floor 108 can be circular such that the walls 110 form a cylinder extending from the floor's edges. In this example the rim 112 can also be circular. In other embodiments the floor 108 and walls 110 can form a vessel 102 with any other desired shape. By way of non-limiting examples, the vessel 102 can be fully or partially shaped as a sphere, ovoid, pyramid, cone, box, or have any other shape or structure with an opening that can be closed by the barrier 104.

In some embodiments the vessel 102 can comprise one or more transparent or translucent materials, such that the contents of the vessel's interior space 106 are at least partially visible through the vessel 102. By way of non-limiting examples, the vessel 102 can comprise glass, plexiglass, clear or translucent plastic, or any other transparent or translucent material. In alternate embodiments the vessel 102 can comprise any other types of material, such as metal, wood, opaque plastic, or any other desired material.

The barrier 104 can be a member that is coupled to the vessel's rim 112, thereby closing the open portion of the vessel 102 defined by the rim 112. In some embodiments the barrier 104 can be adhered or otherwise bonded with the vessel 102 around the entirety of the rim 112 such that it seals the interior space 106. By way of a non-limiting example, the barrier 104 can be bonded with the rim 112 such that the interior space 106 is hermetically sealed. In alternate embodiments the barrier 104 can be continuously or intermittently coupled with the rim 112, walls 110, and/or any other portion of the vessel 102.

Figure 3:
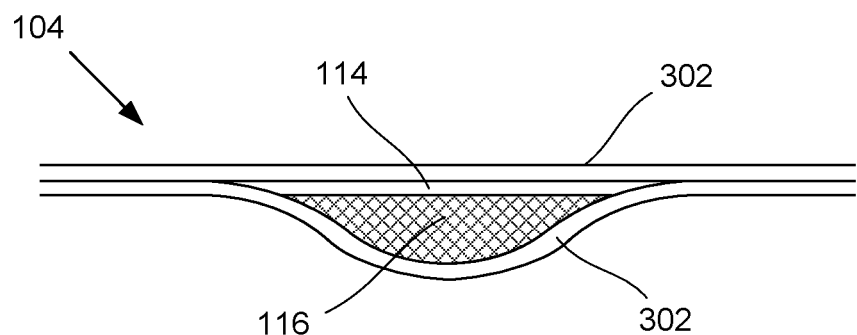
FIG. 3 depicts a close-up view of an embodiment of a barrier defining a marking chamber.

The barrier 104 can have a marking chamber 114 that can contain a marking substance 116. FIG. 3 depicts a close-up of a barrier's marking chamber 114. As shown in FIG. 3, in some embodiments the barrier 104 can comprise two or more layers 302, and the marking chamber 114 can be an area defined between two layers 302. In other embodiments the marking chamber 114 can be a bowl, pouch, pocket, or other receptacle coupled with the underside of the barrier 104.

The marking substance 116 housed in the marking chamber 114 can be a substance that can be applied to the exterior surface of a product when the product passes through the marking chamber 114, as will be discussed further below. In some embodiments the marking substance 116 can be a liquid. By way of non-limiting examples, the marking substance 116 can be paint, ink, oil, or any other liquid that can be applied to a product's surface. In other embodiments the marking substance 116 can be a gel, powder, or any other compound and/or chemical substance.

In some embodiments the marking substance 116 can be visible to human eyes in the visible light spectrum when it is applied to a product's exterior surface. In other embodiments the marking substance 116 can be invisible to human eyes in the visible light spectrum, but become visible when illuminated with other wavelengths of light. By way of non-limiting examples, the marking substance 116 can glow or otherwise become visible when illuminated with ultraviolet light.

The barrier 104 can comprise materials that can enclose the interior space 106 but can be punctured when a product is inserted into and/or through the marking chamber 114. By way of a non-limiting example, the barrier 104 can comprise plastic, foil, or any other desired material.

As shown in FIG. 2, in some embodiments the upper surface of the barrier 104 can be marked with one or more indicator designs 118 that illustrate the location of the barrier's marking chamber 114. As such, a user can insert a product at the location designated by the indicator designs 118 to pass the product into and/or through the marking chamber 114. In other embodiments the upper surface of the barrier 104 can have raised or lowered surfaces, surfaces with different colorings and/or textures, or any other indicator, to designate the location of the barrier's marking chamber 114.

In some embodiments areas of the barrier 104 proximate to the marking chamber 114 can be structurally weaker than surrounding areas, such that the barrier 104 can be punctured at those areas more easily than other areas, thereby facilitating insertion of a product through the barrier 104 into the marking chamber 114. By way of a non-limiting example, the barrier 104 can have micro-perforations above the marking chamber 114 that initially hold the marking chamber 114 closed to contain the marking substance 116, but that facilitate the penetration of a product through the barrier 104. In some embodiments such micro-perforations can serve as indicator designs 118.

Returning to FIG. 1, in some embodiments a tamper-evident container 100 can further comprise one or more base elements 120. A base element 120 can be a structural base or platform upon which contents within the interior space 106 can rest. In some embodiments a base element 120 can additionally or alternately have properties that enhance maintenance and/or development of a product inserted into the interior space 106. By way of a non-limiting example, in some embodiments the base element 120 can be a sponge or other moisture and/or nutrition porous cellular element that can contain or be infused with substances such as water, vitamins, and/or minerals that can assist development of plants held within the vessel 102. In other embodiments the base element 120 can comprise any other materials that can absorb substances that interact with products held within the vessel 102. In alternate embodiments the base element 120 can be absent, and a product can rest on the vessel's floor 108 or be suspended above the floor 108.

Figure 4:
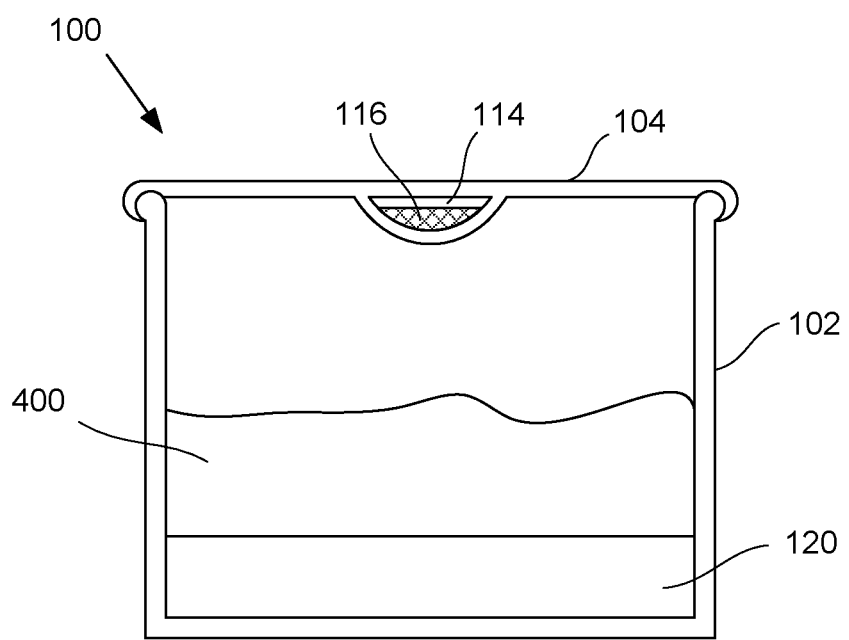
FIG. 4 depicts an embodiment of a tamper-evident container holding a liquid.

As shown in FIG. 4, in some embodiments the vessel 102 can hold water or any other liquid 400 within the interior space 106. When a base element 120 is present in these embodiments, the base element 120 can be fully or partially submerged in the liquid. When the base element 120 is a sponge or other moisture and/or nutrition porous cellular element, the base element 120 can absorb the liquid present in the vessel 102.

Figure 5:
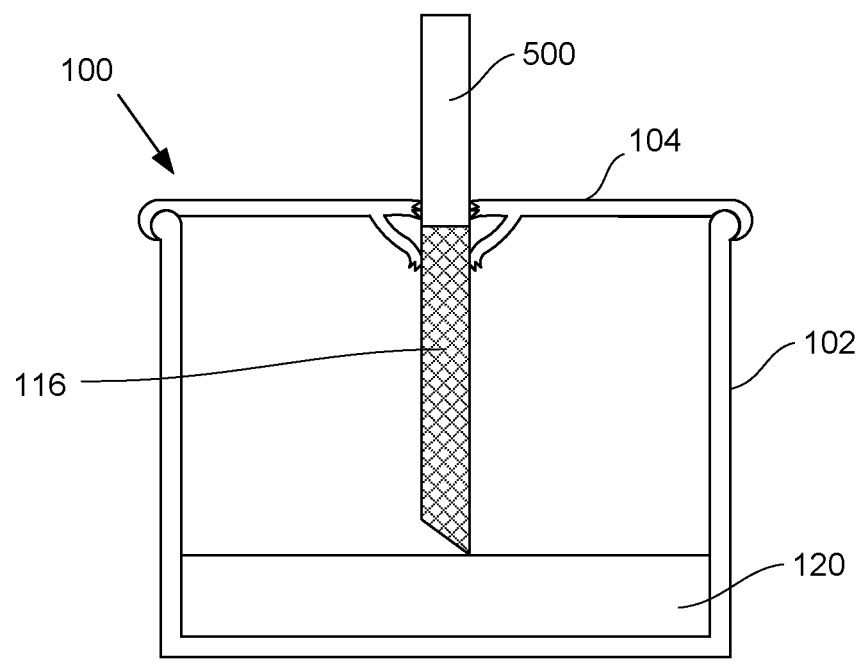
FIG. 5 depicts an embodiment of the tamper-evident container in use with a product.

FIG. 5 depicts an embodiment of a tamper-evident container 100 in use with a product 500. The product 500 can have a portion that is intended to be housed within the tamper-evident container 100 and another portion that is intended to extend out of the tamper-evident container 100. By way of a non-limiting example, the product 500 can be a plant with roots that are to be housed within the tamper-evident container 100 while stem extends out of the tamper-evident container 100 such that its flowers and/or leaves remain outside the tamper-evident container 100.

In use, a portion of the product 500 can be inserted through the barrier 104 and marking chamber 114 into the interior space 106. The barrier 104 can become punctured as the product 500 is inserted. As the product 500 passes through the marking chamber 114, the marking substance 116 within the marking chamber 114 can be applied to the product's exterior surface. As shown in FIG. 5, after the product 500 is inserted into the tamper-evident container 100 through the marking chamber 114, some or all exterior surfaces of the product 500 within the interior space 106 can be coated with the marking substance 116.

The marking substance 116 can be selected such that is can partially and/or completely bond with the surface of the product 500. When the vessel 102 contains a liquid 400 as shown in FIG. 4, the marking substance 116 can be selected such that the liquid 400 will not substantially dissolve the marking substance 116 and/or dissociate the marking substance 116 with the product 500.

As described above, the marking substance 116 can be visible on a product's exterior surface in natural light, or in other wavelengths of light depending on the particular marking substance 116 used. As such, when a product 500 is removed from a tamper-evident container 100 the presence or absence of the marking substance 116 on the product's surface can indicate whether or not it is the original product 500 that was inserted into the tamper-evident container 100.

For example, if the marking substance 116 is present on a product 500 when it is removed from the tamper-evident container 100, a user can have a level of confidence that the product 500 is the original product 500 that was inserted into the tamper-evident container 100.

However, if no marking substance 116 is present on a product 500 when it is removed from the tamper-evident container 100, the absence of the marking substance 116 can indicate that the original product 500 has been replaced by another product or has been otherwise tampered with. By way of non-limiting examples, when the marking substance 116 is not found on a product 500 that is marketed as being the original product 500 inserted into the tamper-evident container 100, the absence of the marking substance 116 can indicate that the original product 500 has been replaced in the tamper-evident container 100 by a counterfeit product or a product of a different quality.

Figure 6:
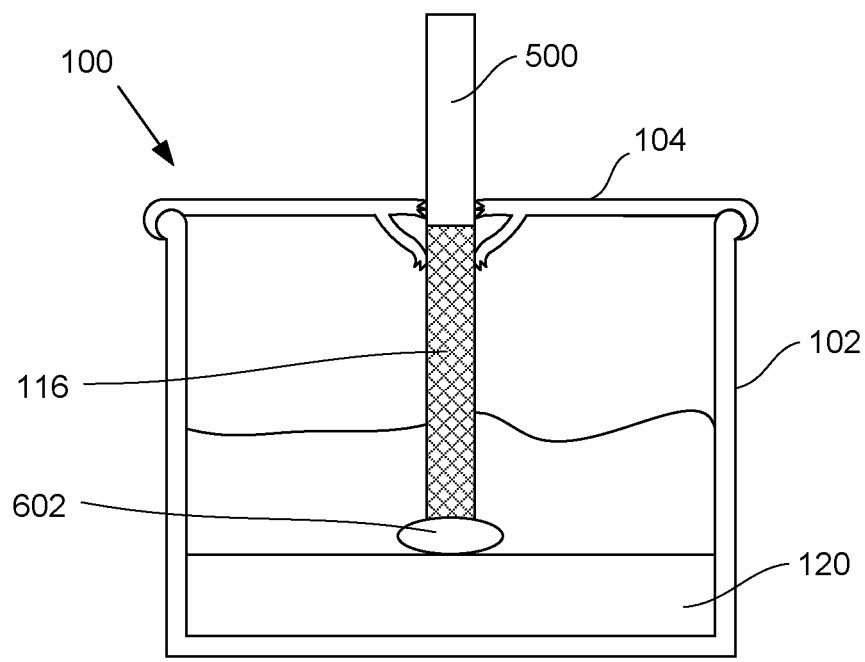
FIG. 6 depicts a tamper-evident container in use when a product it holds is a plant.

FIG. 6 depicts a tamper-evident container 100 in use when the product 500 is a plant. In situations in which the product 500 is a plant, the plant's stem and/or roots can be inserted into the tamper-evident container 100 through the marking chamber 114 such that they are coated with the marking substance 116. Thereafter, the plant can be allowed to grow for a period of time such that its roots expand within the interior space 106. The expansion of the roots can preclude removal of the product 500 through the punctured opening in the barrier 104 formed when the product was inserted. By way of a non-limiting example, the product shown in FIG. 6 has formed a root ball 602 that is larger than the punctured opening in the barrier 104, and as such the root ball 602 would not fit through the opening in the barrier 104 without further tearing or opening the barrier 104. In these embodiments the presence of expanded roots can provide a further level of confidence that a product 500 has not been tampered with, as in order to remove the original product 500 and substitute a replacement the barrier 104 would need to be opened further beyond the original puncture opening.

Figure 7:
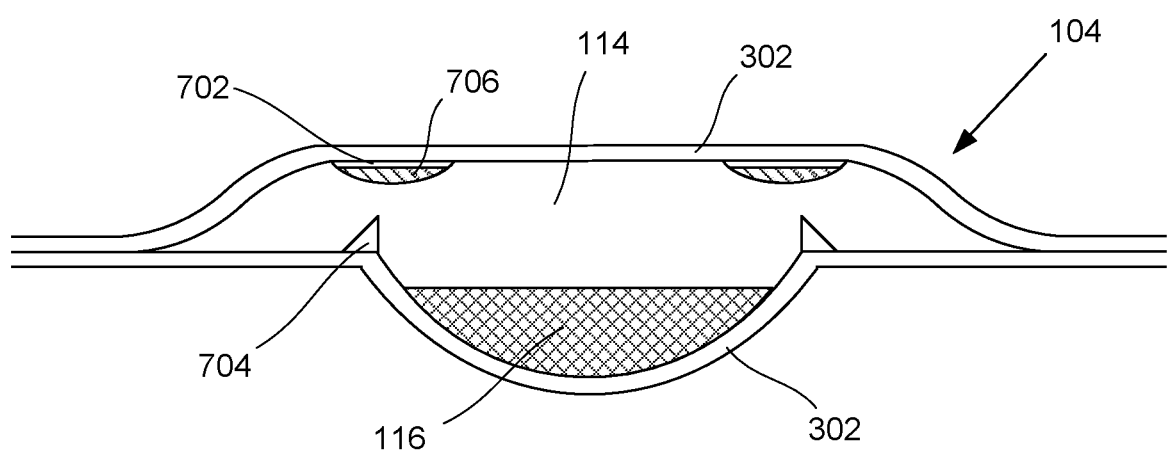
FIG. 7 depicts a close-up view of an alternate embodiment of a barrier.

FIG. 7 depicts a close-up view of an alternate embodiment of a barrier 104. As with the embodiment shown in FIG. 3, the marking chamber 114 can be defined between an upper layer 302 and a lower layer 302 of the barrier 104. In the embodiment shown in FIG. 7, one or more tamper indicator chambers 702 can be present on the upper layer 302, while corresponding teeth 704 can be present on the lower layer 304 below each tamper indicator chamber 702. In alternate embodiments the teeth 704 can be on the upper layer 302 and the tamper indicator chambers 702 can be on the lower layer 302.

The tamper indicator chambers 702 can be filled with a tamper indicator substance 706. Similarly to the marking substance 116, the tamper indicator substance 706 can be a liquid, gel, powder, or other substance that can mark a product 500 or the tamper-evident container 100. However, the tamper indicator substance 706 can be different from the marking substance 116 in one or more ways, in order to indicate the presence of tampering rather than the absence of tampering. By way of non-limiting example, the tamper indicator substance 706 can differ from the marking substance 116 by being a different type of substance, having a different color or appearance, or being visible at different wavelengths of light.

The teeth 704 can be protrusions that are configured to puncture the tamper indicator chambers 702 and thereby release the tamper indicator substance 706 into the marking chamber 114.

In use, when a user attempts to remove an original product 500 from the tamper-evident container 100 by pulling the product 500 upward through the barrier 104, portions of the product 500 below the barrier 104 can push the lower layer 302 upward. Upward movement of the lower layer 302 can cause the teeth 704 to puncture the tamper indicator chambers 702 and release the tamper indicator substance 706. The tamper indicator substance 706 can thus coat the product 500 as it is being removed, mark the barrier 104 itself, mix with liquid 400 inside the vessel 102, and/or otherwise become visible such that the product 500 and/or tamper-evident container 100 is marked with the tamper indicator substance 706. Accordingly, release of the tamper indicator substance 706 can indicating tampering with the original product 500.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. A method of marking a product, comprising:
providing a tamper-evident container comprising a vessel and a barrier that together enclose an interior space, wherein said barrier has a marking chamber at least partially filled with a marking substance; and
marking a product with said marking substance by inserting said product into said barrier, passing said product through said marking chamber such that said marking substance is applied to the surface of said product, and passing said product into said interior space,
wherein when said product is later removed from said tamper-evident container, the presence of said marking substance on said product indicates that it is the original product and the absence of said marking substance on said product indicates that the product has been replaced; and
wherein said product is a plant and the plant's roots and/or stem are inserted into said interior space.

2. The method of claim 1, wherein said vessel is at least partially filled with water.

3. The method of claim 1, wherein said vessel houses a moisture and/or nutrition porous cellular element configured to provide water, vitamins, and/or minerals to the plant.

4. The method of claim 1, further comprising allowing said plant's roots to grow and expand larger than the size of an aperture in said barrier formed when said plant was inserted through said barrier.

* * * * *